US010591128B2

(12) United States Patent
Herlin et al.

(10) Patent No.: US 10,591,128 B2
(45) Date of Patent: Mar. 17, 2020

(54) AUTOMOTIVE LIGHTING AND/OR SIGNALLING DEVICE WITH SEGMENTED LIGHTING PORTIONS

(71) Applicant: MARELLI AUTOMOTIVE LIGHTING ITALY S.P.A., Turin (IT)

(72) Inventors: Jean-Pascal Herlin, Turin (IT); Lorenzo Spadaccini, Turin (IT); Giulio Manfreda, Turin (IT); Michele Antonipieri, Turin (IT)

(73) Assignee: MARELLI AUTOMOTIVE LIGHTING ITALY S.P.A., Turin (IT)

( * ) Notice: Subject to any disclaimer, the term of this patent is extended or adjusted under 35 U.S.C. 154(b) by 0 days.

(21) Appl. No.: 16/043,700

(22) Filed: Jul. 24, 2018

(65) Prior Publication Data

US 2019/0257490 A1    Aug. 22, 2019

(30) Foreign Application Priority Data

Feb. 21, 2018  (IT) .............................. 102018000002897

(51) Int. Cl.
*F21S 41/24* (2018.01)
*F21S 43/14* (2018.01)
(Continued)

(52) U.S. Cl.
CPC ............. *F21S 41/24* (2018.01); *F21S 41/285* (2018.01); *F21S 43/14* (2018.01); *F21S 43/15* (2018.01);
(Continued)

(58) Field of Classification Search
CPC .......... F21S 41/24; F21S 41/285; F21S 43/14; F21S 43/26; G02B 5/0205
See application file for complete search history.

(56) References Cited

U.S. PATENT DOCUMENTS 4,948,214 A * 8/1990 Hamblen ............. G02B 3/0012
359/654
2007/0274102 A1   11/2007 Bohme et al.
(Continued)

FOREIGN PATENT DOCUMENTS

DE    102013007339 A1   10/2014
DE    102014110225 A1    1/2016
(Continued)

OTHER PUBLICATIONS

Communication dated Jan. 21, 2019 enclosing the extended European Search Report dated Jan. 15, 2019 for European Application No. 18179643.4.

*Primary Examiner* — Mary Ellen Bowman
(74) *Attorney, Agent, or Firm* — Howard & Howard Attorneys PLLC

(57) ABSTRACT

A lighting and/or signalling device, in particular for the automotive sector, comprising: at least two LED light sources, powered and activated separately, each facing a respective light input wall of a corresponding light guide, wherein the light guides emit the light of the LED light sources through at least two separate lighting portions at a front wall. The light guides are equipped with diffuser elements arranged on a rear wall opposite to the front wall. At least one reflector element is associated with each light guide directly facing the respective diffuser elements so as to reflect the light towards the front wall. The light guides are juxtaposed and adjacent to each other at at least one respective inner wall. The light guides are mechanically and optically separated by barrier elements which prevent the passage of light between the light guides at the at least one inner wall.

31 Claims, 13 Drawing Sheets

(51) Int. Cl.
*F21S 43/20* (2018.01)
*F21S 41/20* (2018.01)
*G02B 5/02* (2006.01)
*F21S 43/15* (2018.01)
*F21S 43/249* (2018.01)
*F21V 8/00* (2006.01)
*F21S 43/237* (2018.01)
*F21S 43/245* (2018.01)
*F21S 43/239* (2018.01)
*F21S 43/247* (2018.01)

(52) U.S. Cl.
CPC ........... *F21S 43/237* (2018.01); *F21S 43/239* (2018.01); *F21S 43/245* (2018.01); *F21S 43/247* (2018.01); *F21S 43/249* (2018.01); *F21S 43/26* (2018.01); *G02B 5/0205* (2013.01); *G02B 6/008* (2013.01); *G02B 6/0061* (2013.01); *G02B 6/002* (2013.01); *G02B 6/0016* (2013.01); *G02B 6/0036* (2013.01); *G02B 6/0068* (2013.01)

(56) References Cited

U.S. PATENT DOCUMENTS

| | | | |
|---|---|---|---|
| 2009/0316077 A1* | 12/2009 | Li | G02B 6/0068 349/65 |
| 2011/0221785 A1 | 9/2011 | Joung et al. | |
| 2012/0224385 A1* | 9/2012 | Godbillon | G02B 6/001 362/511 |
| 2013/0314946 A1* | 11/2013 | Wilson | F21S 41/24 362/612 |
| 2017/0299797 A1 | 10/2017 | Ezell et al. | |
| 2017/0311029 A1 | 10/2017 | Jung et al. | |

FOREIGN PATENT DOCUMENTS

| | | |
|---|---|---|
| EP | 1840626 A1 | 10/2007 |
| EP | 2431800 A1 | 3/2012 |
| WO | 2008013408 A1 | 1/2008 |
| WO | 2011030941 A1 | 3/2011 |
| WO | 2012011327 A1 | 1/2012 |

\* cited by examiner

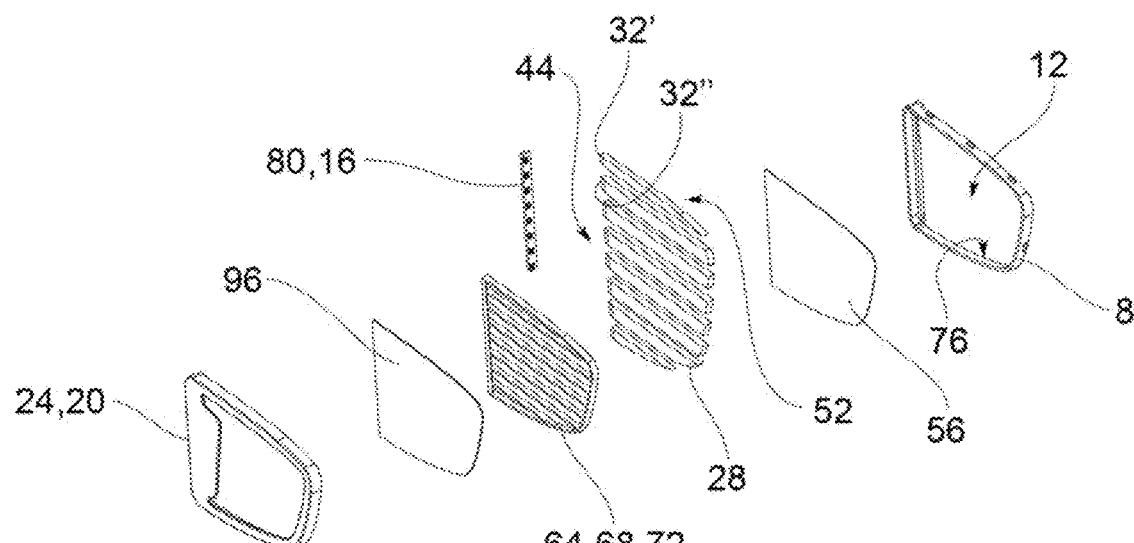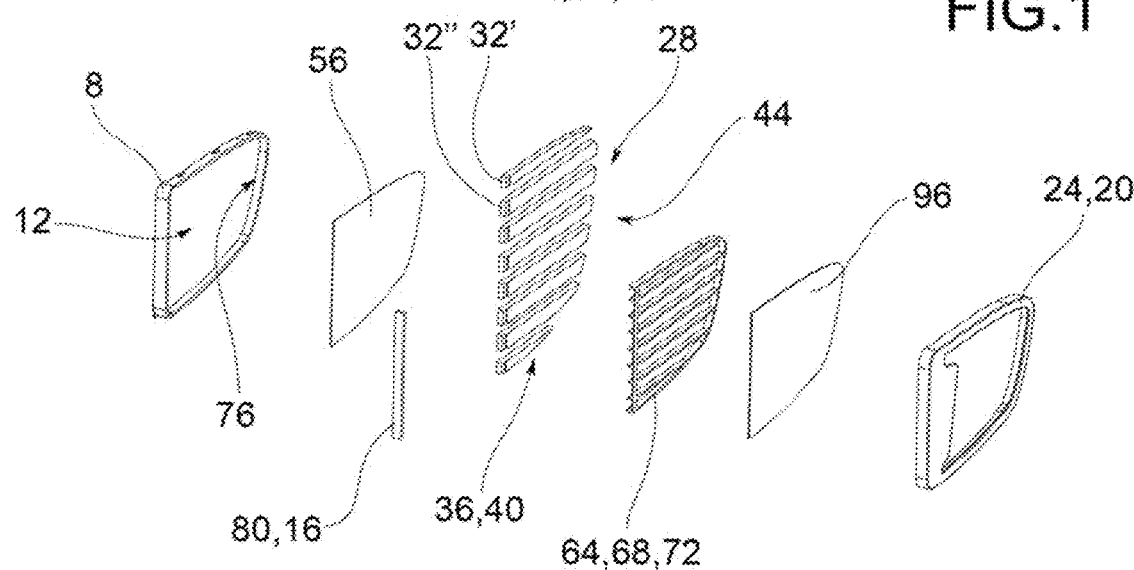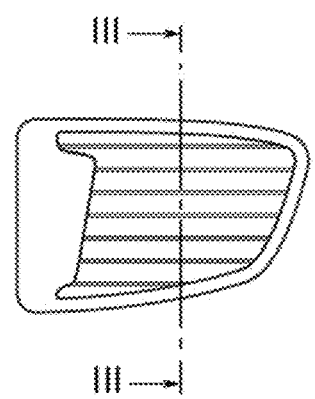
FIG.1
FIG.2  FIG.3a  FIG.3b

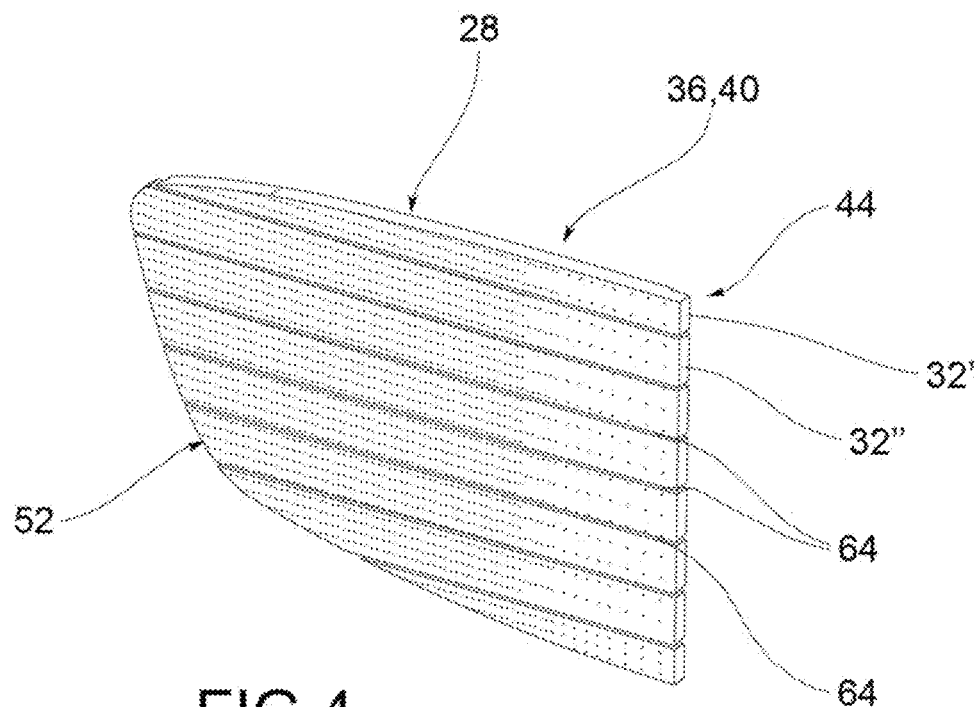
FIG.4
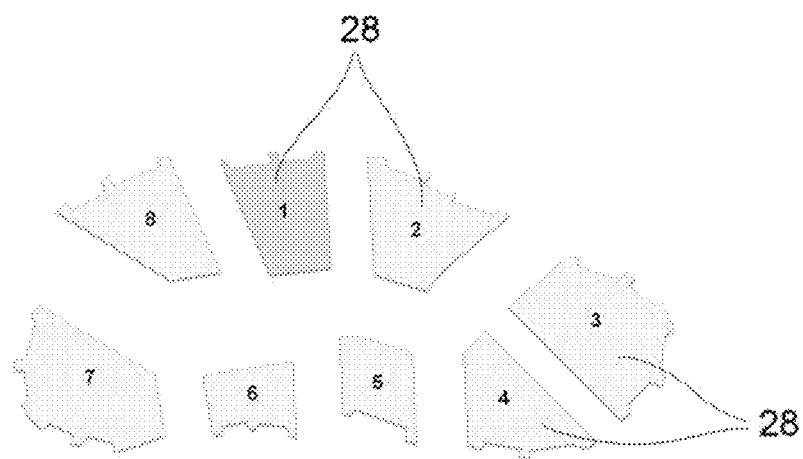
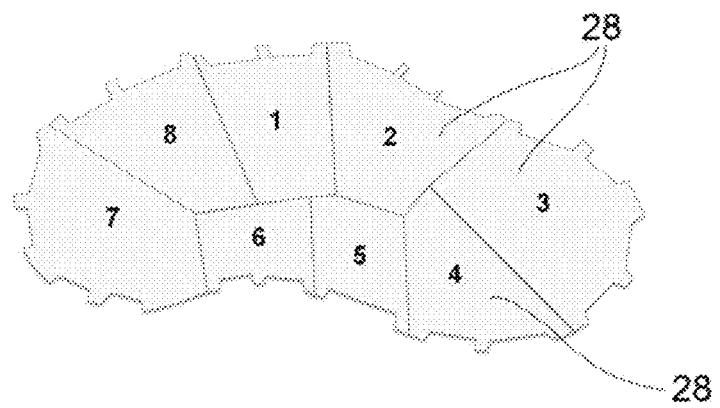
FIG.5

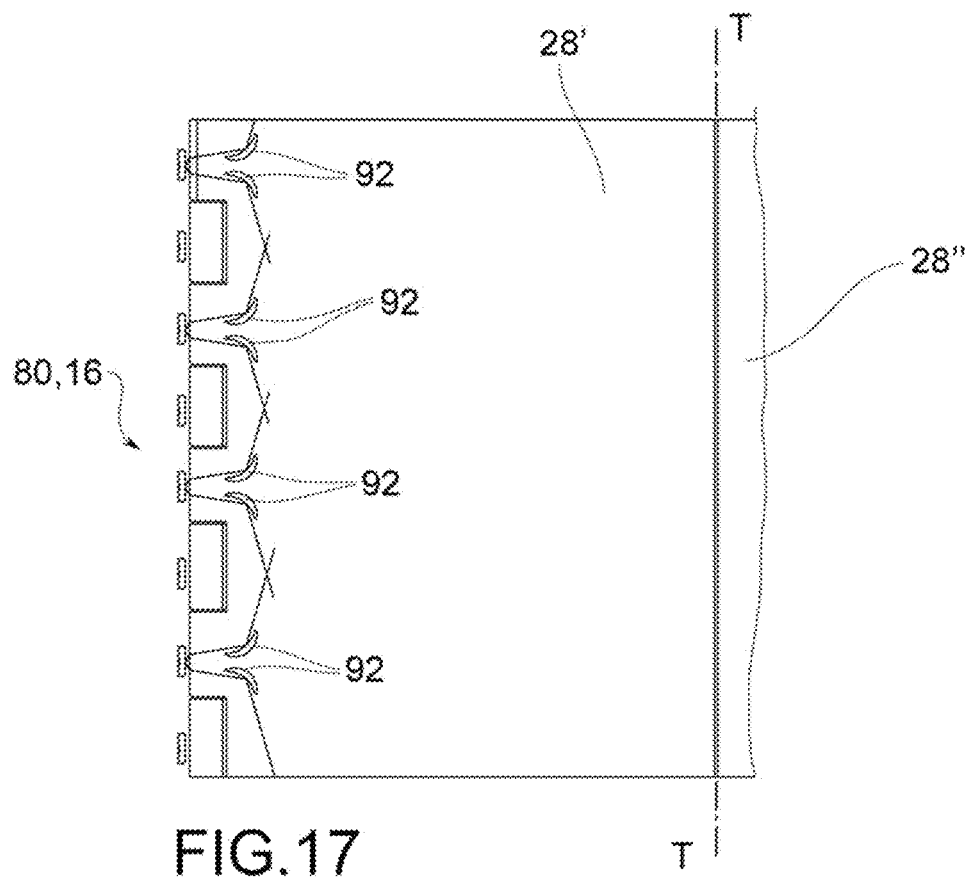
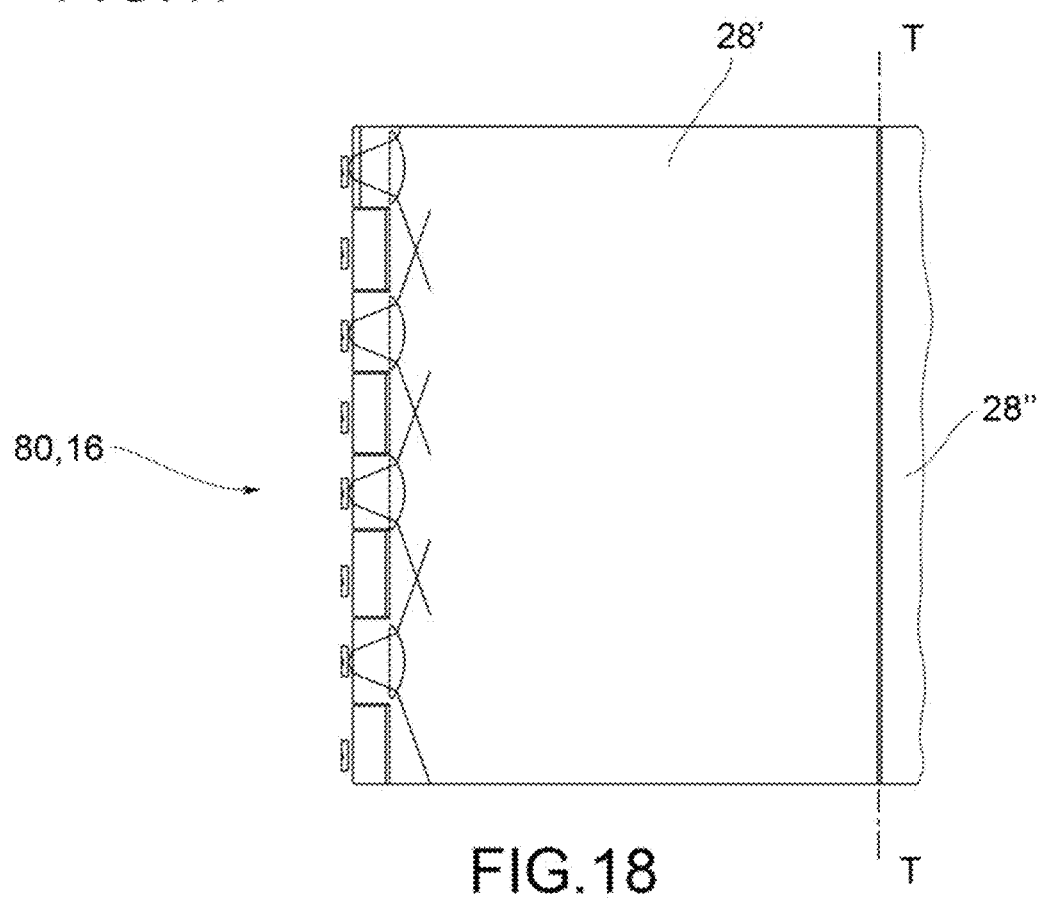

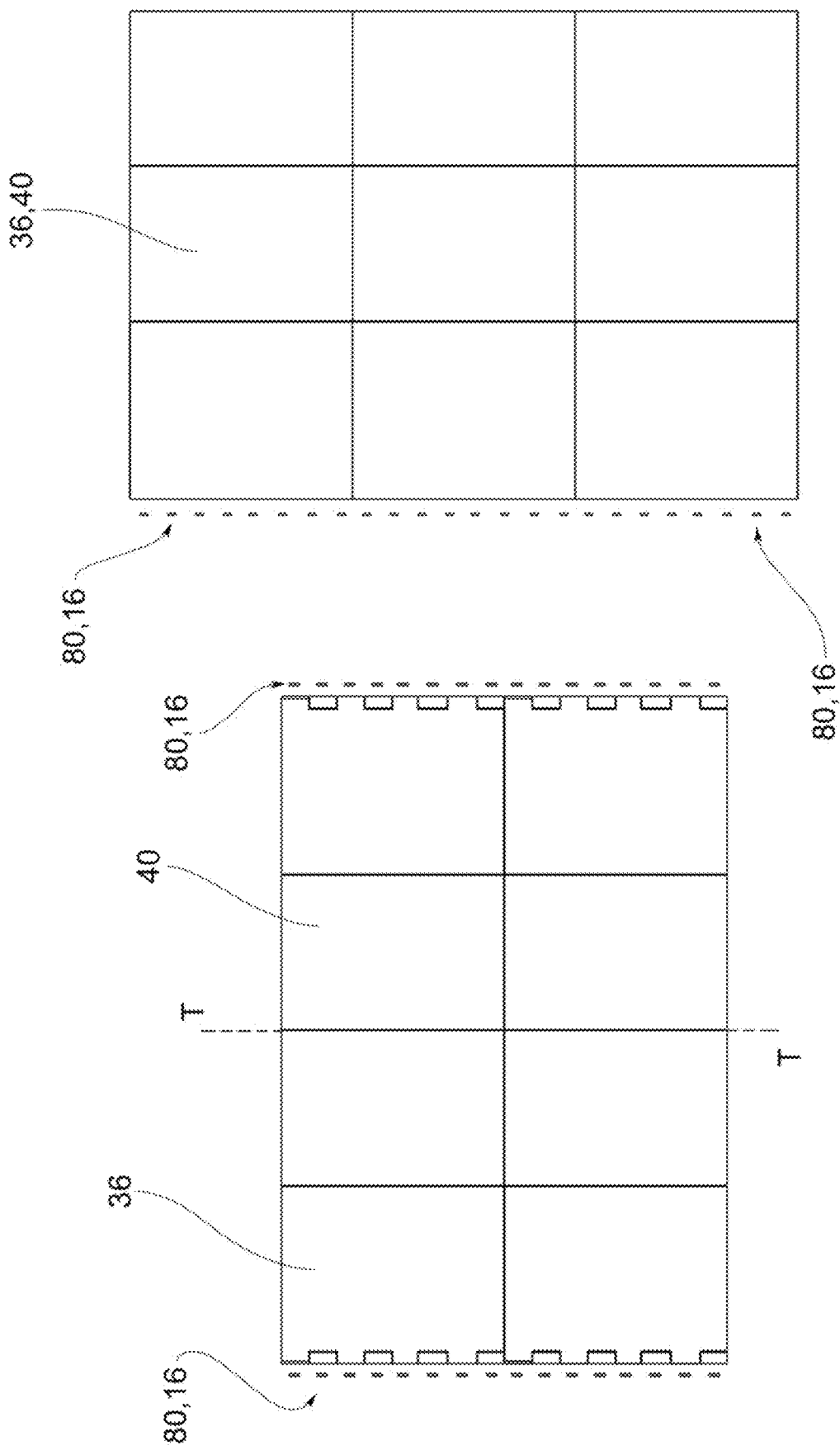

AUTOMOTIVE LIGHTING AND/OR SIGNALLING DEVICE WITH SEGMENTED LIGHTING PORTIONS

CROSS-REFERENCE TO RELATED APPLICATIONS

The present application claims priority to and all the benefits of Italian Patent Application No. 102018000002897, filed on Feb. 21, 2018, which is hereby expressly incorporated herein by reference in its entirety.

BACKGROUND OF THE INVENTION

1. Field of the Invention

The present invention relates to an automotive lighting and/or signalling device with segmented lighting portions.

2. Description of the Related Art

The term automotive lighting and/or signalling device is used herein in a very broad sense in order to comprise both a rear and front automotive lamp, the latter also being called headlight or headlamp.

Therefore, a position light, a direction indicator light, a stop light, a rear fog light, a reversing light, a dipped-beam headlamp, a high-beam headlamp and the like, are included.

Moreover, the term is also meant to include a map light, a light for an instrument panel or part thereof; thus, the automotive lighting and/or signalling device may be located both inside and outside the vehicle.

As is known, the automotive lighting and/or signalling devices may be used both for lighting and for sending visual signals.

To these ends, the devices comprise a plurality of lighting portions having different colors, different levels of brightness (also according to regulations to be complied with) and the like.

The need is increasingly felt to make automotive lighting and/or signalling devices which ensure an increased homogeneity of the lighting portions in order to meet appearance-related in addition to functional needs.

To this end, there are solutions in the art with OLEDS which ensure an increased homogeneity of the lighting portions; however, such solutions are quite costly and in any case have limitations in terms of making different adjacent lighting portions, which may also be illuminated independently from one another.

SUMMARY OF THE INVENTION

This latter limitation is not negligible since the need is increasingly felt in the art not only to use the automotive lamp as an instrument for meeting type-approval needs in order to obtain light beams which are to comply with specific photometric needs, but also as specific design instrument of the vehicle on which the lamp is applied.

Thus, not only does the lighting pattern emitted by the lamp serve the function of fulfilling the function of signalling and/or illuminating, but also the one of creating an accurate wanted light effect.

Moreover, the lighting and/or signalling device may also be used in order to send light signals such as text, graphic symbols, and also to make light animations created by accurate sequences of turning on light portions.

Therefore, the need is felt in the art to make available an automotive lighting and/or signalling device which allows the technical effects mentioned above to be obtained, which ensures an increased illuminating homogeneity (comparable with the one which may be obtained with OLEDS), albeit without having the drawbacks of the OLED technology.

Such a need is met by an automotive lighting and/or signalling device, in particular for the automotive sector, comprising: at least two LED light sources, powered and activated separately, each facing a respective light input wall of a corresponding light guide. The light guides are suitable to emit the light of the LED light sources through at least two separate lighting portions at a front wall. The light guides are equipped with diffuser elements arranged on a rear wall opposite the front wall. At least one reflector element is associated with each light guide directly facing the respective diffuser elements so as to reflect the light towards the front wall. The light guides are juxtaposed and adjacent to each other at at least one respective inner wall. The light guides are mechanically and optically separated by barrier elements which prevent the passage of light between the light guides at the at least one inner wall.

Other embodiments of the present invention are described in the dependent claims.

BRIEF DESCRIPTION OF THE DRAWINGS

Further features and advantages of the present invention will become more comprehensible from the following description of preferred, non-limiting embodiments, in which:

FIG. 1 shows a perspective view, in separate parts, of a lighting and/or signalling device according to one embodiment of the present invention;

FIG. 2 shows a front view, in assembled configuration, of the lighting and/or signalling device in FIG. 1;

FIGS. 3a and 3b show sectional views of the lighting and/or signalling device in FIG. 1, according to two alternative embodiments, along the sectional plane III-III indicated in FIG. 2;

FIG. 4 shows a perspective view of certain components of the lighting and/or signalling device in FIG. 1;

FIG. 5 shows a front view of light guides of a lighting and/or signalling device according to a possible variant;

FIG. 14b shows a sectional view of a further variant of the solution in FIGS. 10 to 14a;

FIGS. 17 to 18 show plan views of the light guides in FIG. 15, according to two possible variants of the present invention;

FIGS. 19 to 21 show plan views of the light guides according to possible embodiments of the present invention;

The elements or parts of elements common to the embodiments described later will be indicated using the same reference numerals.

DETAILED DESCRIPTION OF THE INVENTION

Figure 6:
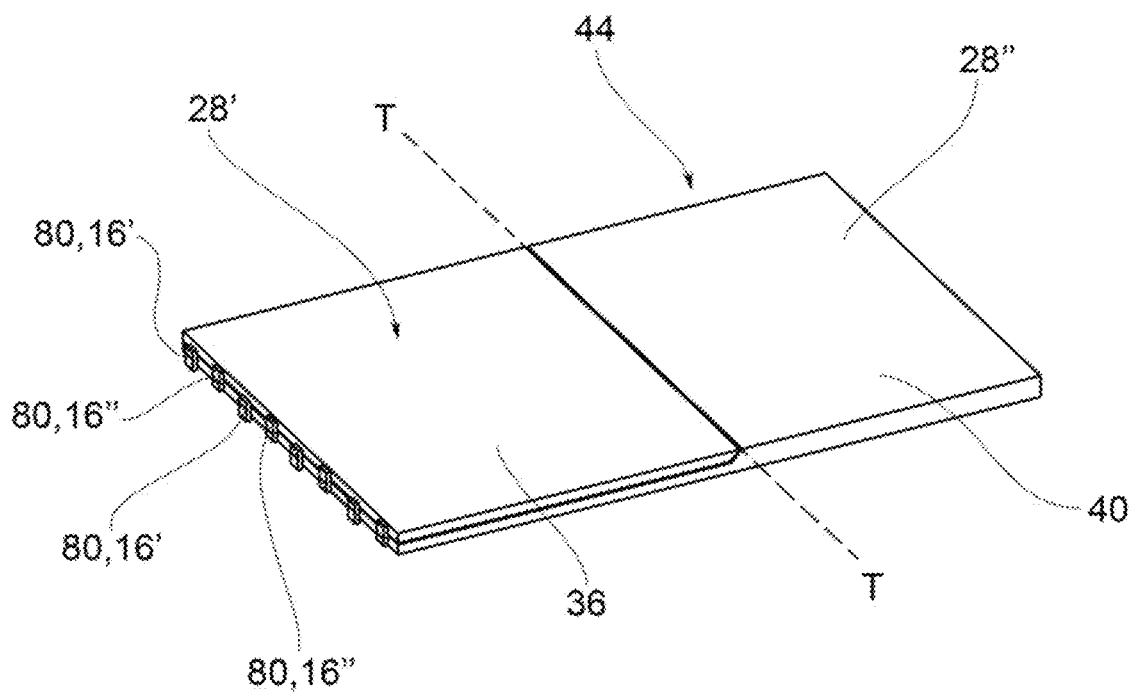
FIG. 6 shows a perspective view of two light guides, in assembled view, according to one possible embodiment of the present invention.
Figure 7:
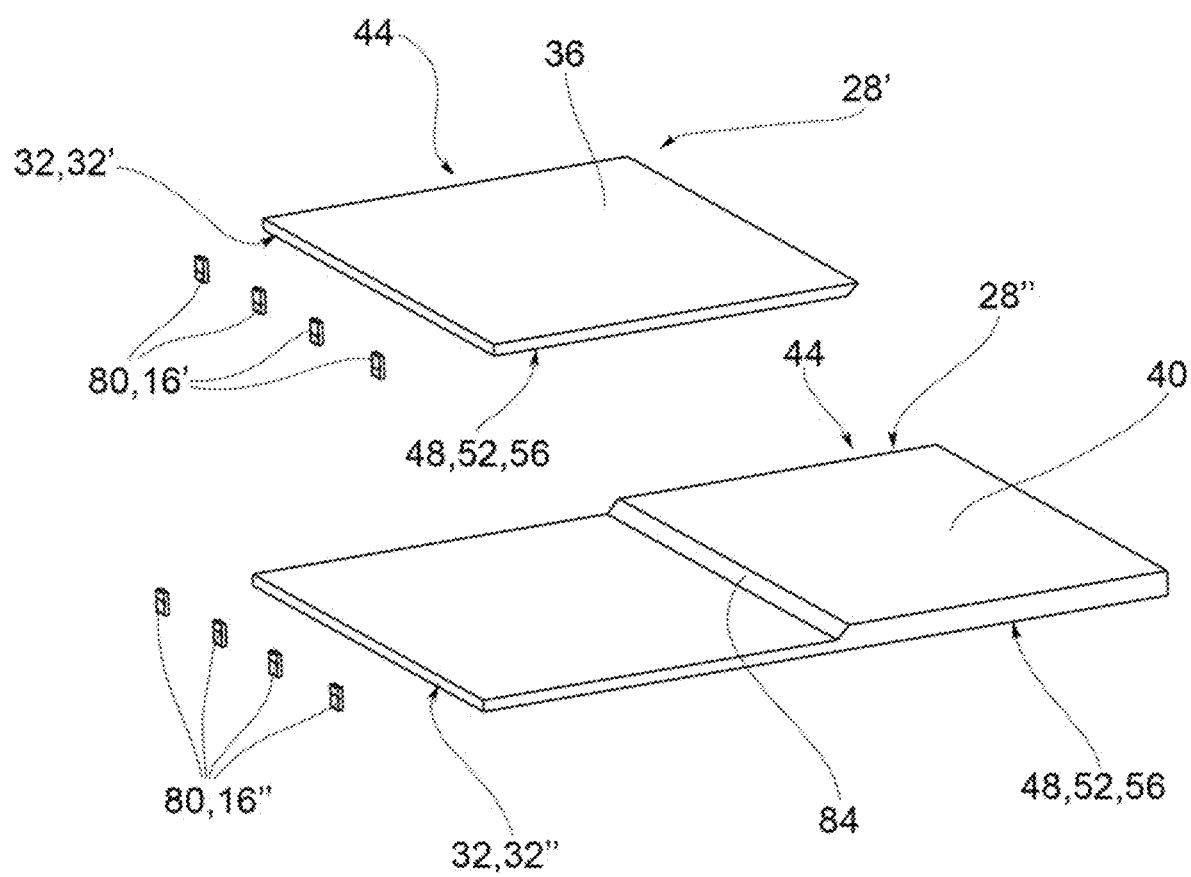
FIG. 7 shows a perspective view, in separate parts, of the light guides shown in FIG. 6.
Figure 8:
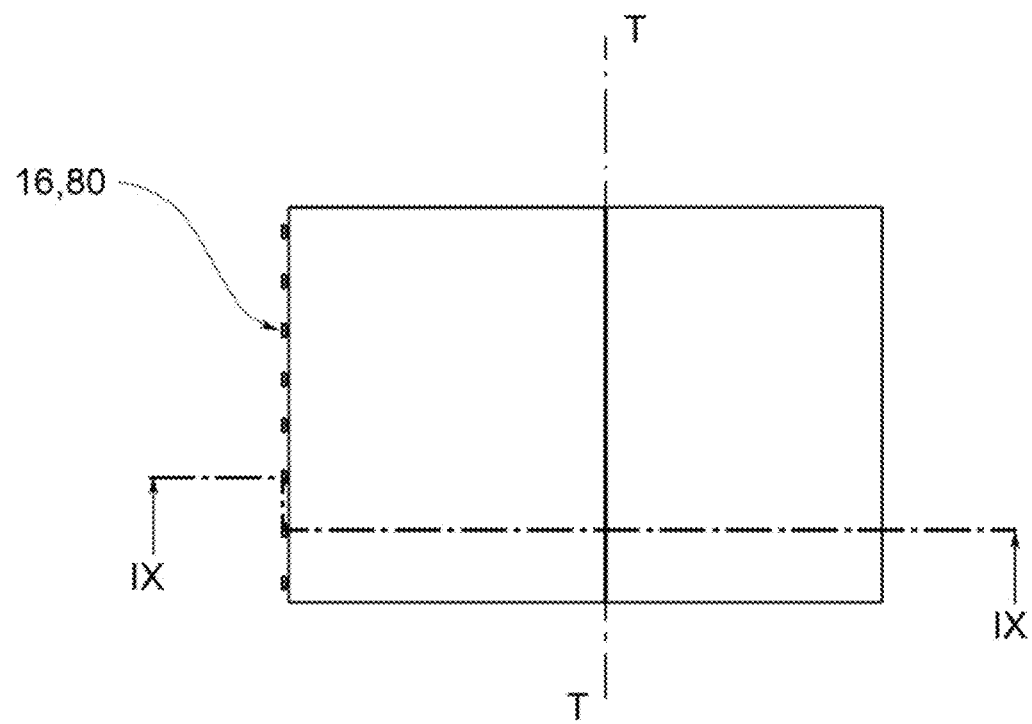
FIG. 8 shows an plan view of the light guides in FIG. 6.
Figure 9:
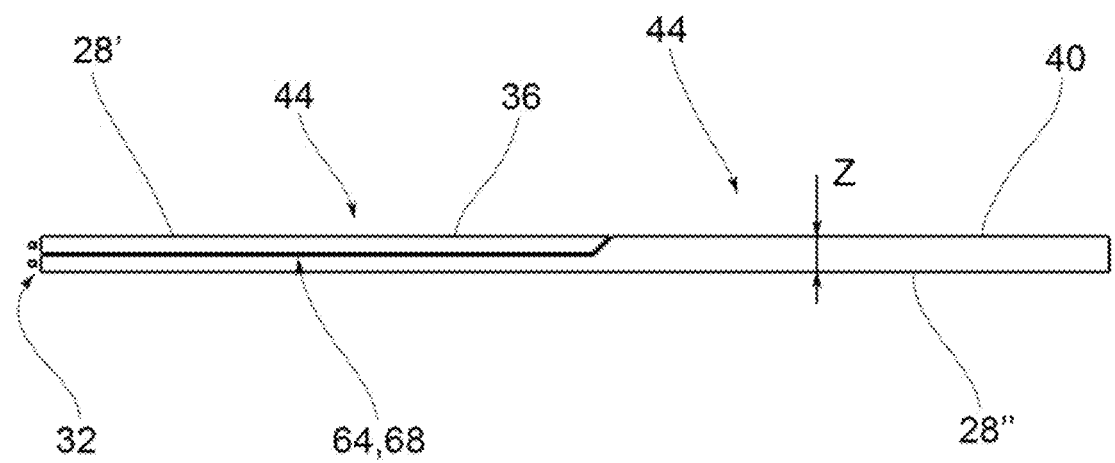
FIG. 9 shows a sectional view of the light guides in FIG. 8, along the cross-section plane IX-IX indicated in FIG. 8.
Figure 10:
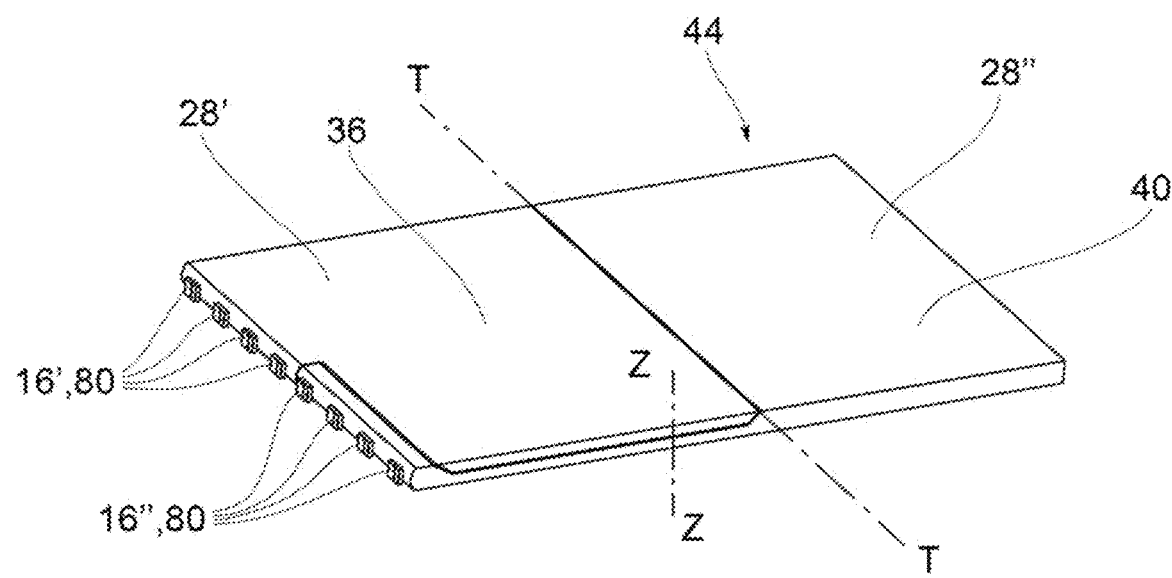
FIG. 10 shows a perspective view, in assembled configuration, of two light guides according to a further embodiment of the present invention.
Figure 11:
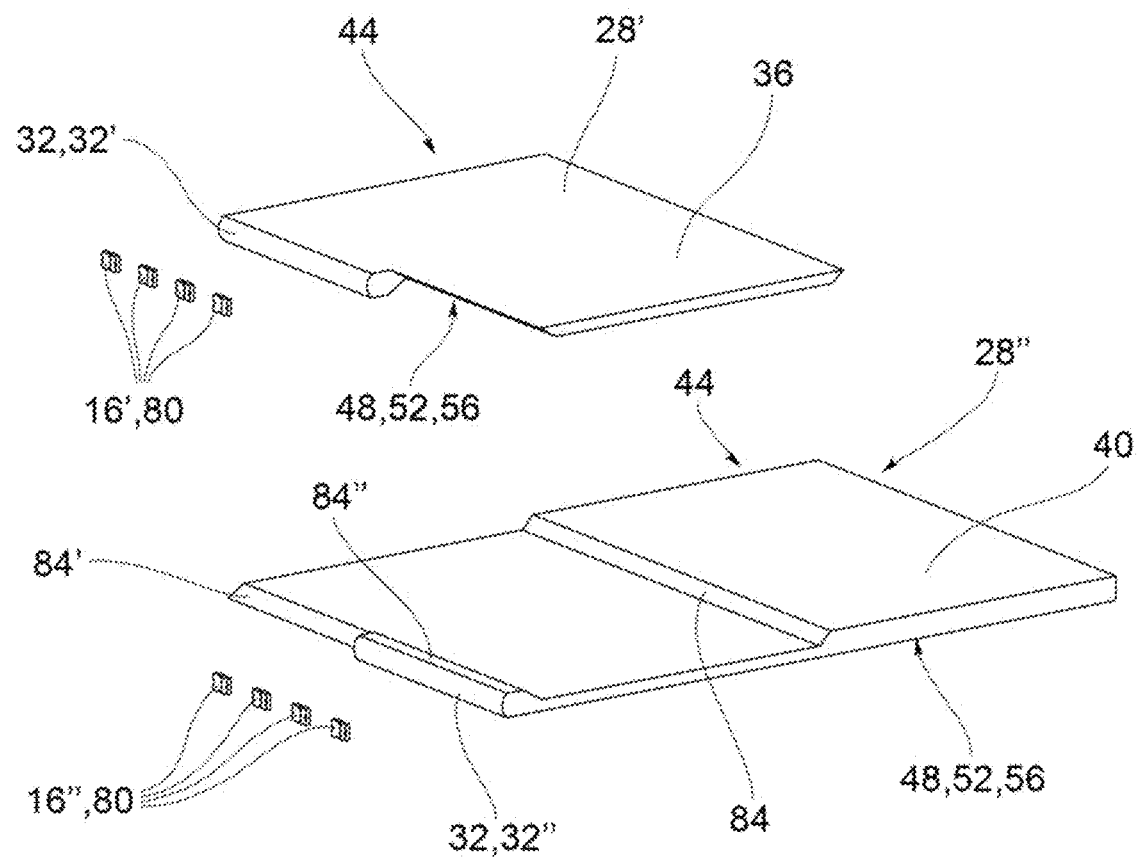
FIG. 11 shows a perspective view, in separate parts, of the light guides in FIG. 10.
Figure 12:
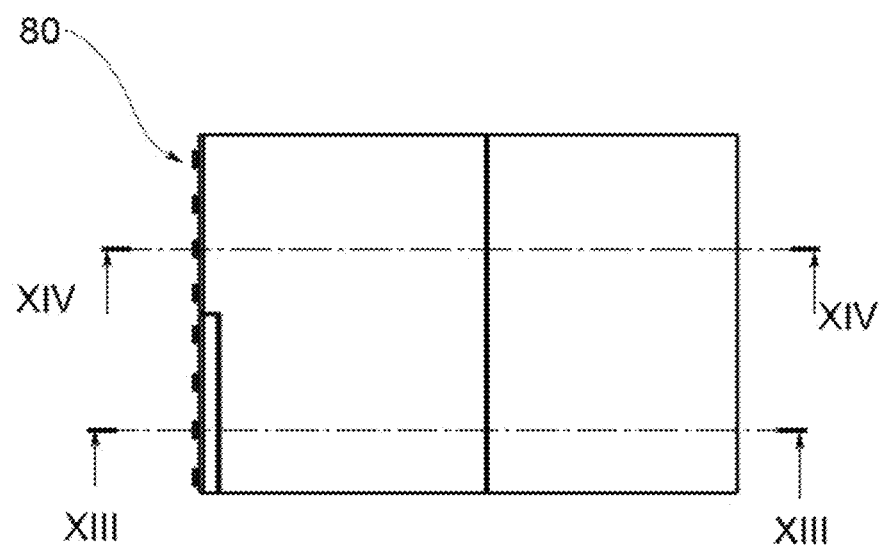
FIG. 12 shows a plan view of the light guides in FIG. 10.
Figure 13:
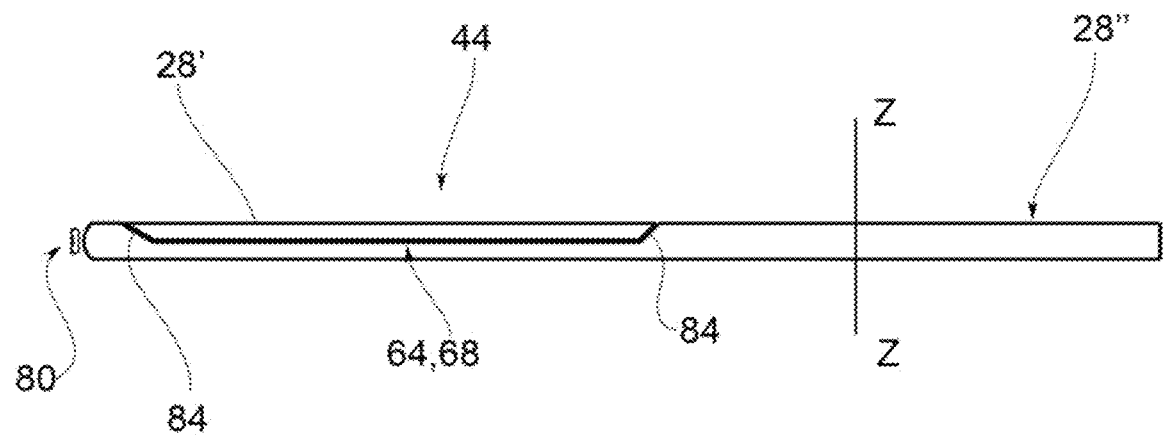
FIG. 13 shows a sectional view of the light guides in FIG. 12, along the cross-section plane XIII-XIII in FIG. 12.

With reference to the aforesaid drawings, 4 indicates a lighting and/or signalling device as a whole, such as an automotive lamp, to which the following disclosure refers without however being less general.

As mentioned above, the term lighting and/or signalling device may indifferently mean a rear automotive lamp or a front automotive lamp, the latter also called headlight or headlamp, comprising at least one external vehicle light serving a function of illuminating and/or signalling, as with for example a position light, which may be a front, rear, side position light of a direction indicator light, a stop light, a rear fog light, a high-beam headlamp, a dipped-beam headlamp and the like.

Moreover, the term lighting and/or signalling device also includes a map light, a light for an instrument panel or part thereof, a display and so on.

Thus, as better described below, in the signalling function thereof, the device may comprise the possibility of sending light signals, logos, but also text and light messages of any kind.

The lighting and/or signalling device 4 comprises a container body or housing 8, usually made of polymeric material, which typically allows fastening the lighting and/or signalling device 4 to the related vehicle.

For the purposes of the present invention, the container body or housing 8 may have any shape and size, and also positioning: for example, the container body 8 may not be directly associated with the body or other external fastenings of the associated vehicle.

As shown, the container body 8 may also be associated internally to the vehicle, for example on the dashboard, on the instrument panel, on the parcel shelf and so on.

The container body 8 delimits a containment seat 12 which accommodates a plurality of components of the lighting and/or signalling devices, and in particular LED light sources 16.

The container body 8 is for example, at least partially associated to close a lenticular body 20 so as to close the containment seat 12 which accommodates the at least one LED light source 16.

For the purposes of the present invention, the lenticular body 20 may be external to the lighting and/or signalling device 4 so as to define at least one outer wall of the lighting and/or signalling device directly subjected to the atmosphere.

The lenticular body 20 closes the containment seat 12 and is suitable for being crossed by the light beam generated by the LED light source 16 which is transmitted outside the containment seat 12.

To this end, the lenticular body 20 is made with at least partially transparent or semi-transparent or translucent material, it also being capable of including one or more opaque portions, in any case so as to allow the at least partial crossing of the light beam generated by the light source.

According to possible embodiments, the material of the lenticular body 20 is a resin such as PMMA, PC and the like.

A mask 24 for conveniently delimiting light emission portions of the lighting and/or signalling device 4 may also be applied to the lenticular body 20, as better described later.

The lighting and/or signalling device 4 comprises at least two LED light sources 16', 16" powered and activated separately, each facing a light guide 28', 28".

In particular, the LED light sources 16', 16" each face a respective light input wall 32', 32" of the corresponding light guide 28', 28" through which the light beam generated is channeled into the light guide 28', 28" and transmitted by the latter.

It is therefore apparent that the LED light sources 16 are placed at an edge of the respective light guides 28.

In particular, the light guides 28', 28" emit the light of the LED light sources 16', 16" through at least two respective and separate lighting portions 36, 40 at a front wall 44 of each light guide 16', 16".

The light guides 28', 28" and the respective LED light sources 16', 16" preferably satisfy a total internal reflection condition of the light beam passing through the light guides themselves.

Figure 24:
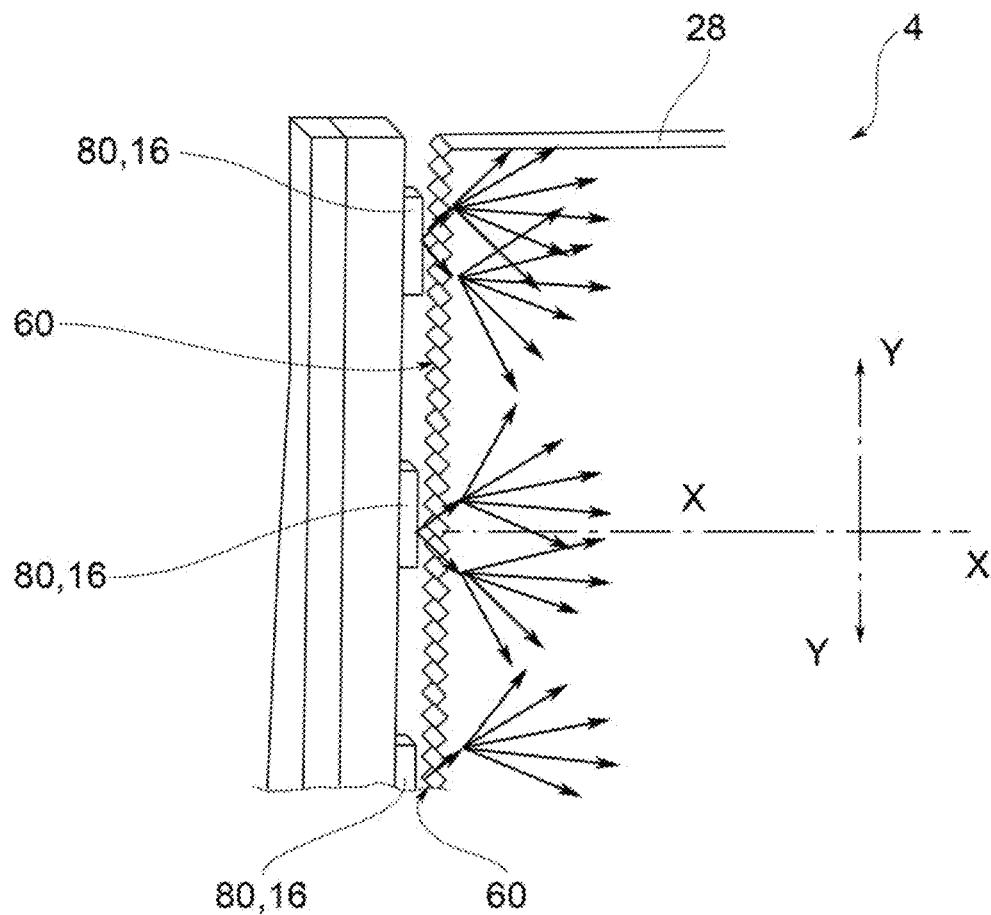

In the case in point, the couplings between the light guides 28', 28" and the respective LED light sources 16', 16" are configured so that the light beam propagated inside such light guides 28', 28" meets a total internal reflection condition between the opposite faces of the light guides 28', 28" with respect to a main propagation direction X-X and at the same time it diffuses towards the edges of the aforesaid light guides according to a direction Y perpendicular to such a main propagation direction X (FIG. 24).

Thus, the light input wall 32', 32" of the light guides 28', 28", which is directly facing the corresponding LED light sources 16', 16", in turn transmits the light inside the light guide 28', 28" in the total internal reflection condition.

The light input walls 32', 32" of the light guides 28', 28" may comprise lenses 60, for example sinusoidal, cylindrical, or prismed section groove or protrusions, for opening the light beam along the direction Y-y perpendicular to the main propagation direction X-X.

Preferably, the lenses 60 have a pitch between 50 μm and 2 mm.

The light guides 28', 28" in turn are equipped with diffuser elements 48 arranged on a rear wall 52 opposite the front wall 44, to extract the light beam propagated in such light guides 28', 28".

Figure 23:
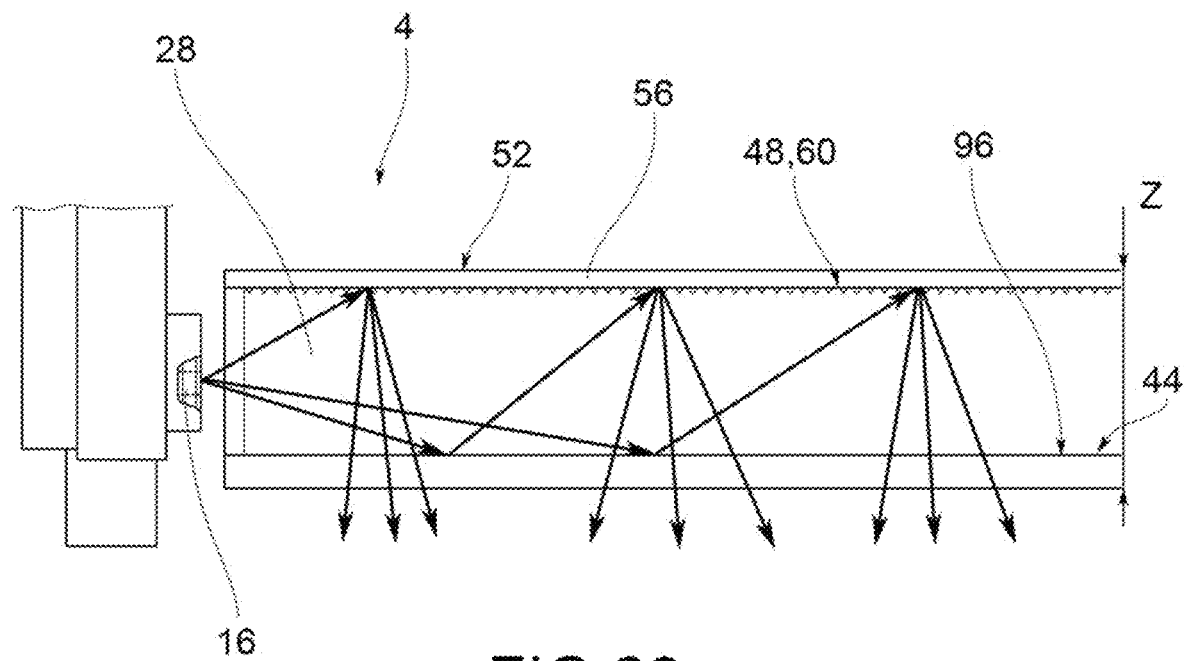
FIGS. 23 to 24 show diagrammatic views of the operation of the lighting and/or signalling devices according to the present invention.

In other words, as schematized in FIGS. 23 to 24, the light beam generated by each light source 16 penetrates the light guide through the light input wall 32 and is reflected in the light guide 28 until it meets the diffuser elements 48 which reflect it outside the light guide.

Namely, the light beam is diffused by the diffuser elements 48 placed on the rear wall 52, and therefore is sent towards the front wall 44, which it leaves from.

However, part of the light beam is diffused by the diffuser elements 48 also in the opposite direction, i.e. on the side opposite to the front wall 44.

Each light guide 28', 28" is therefore equipped with at least one reflector element 56 associated with each light guide 28', 28" so as to be directly facing the respective diffuser elements 48 to reintroduce the light leaving the light guide 28 and reflect it towards the front wall 44.

Thus, the reflector elements 56 are arranged at the back of the diffuser elements 48.

It therefore is apparent that the lighting portion 36, 40 is in fact a lighting surface formed by a light guide 28 powered by the light input wall 32 placed on a side thereof.

According to a possible embodiment, the diffuser elements 48 are micro-lenses, such as for example punctiform micro-depressions which diffuse the light towards the front wall 44.

Preferably, the diffuser elements 48 are arranged according to a non-homogeneous scheme having a density that increases as the distance from the corresponding light source 16 increases along the extension of the light guide 28', 28". An example of such a non-homogeneous scheme is for example, shown in FIG. 4.

According to a possible embodiment, the reflector element 56 is a white film reflecting the light coming from the rear wall 52 of the light guides 28', 28".

The reflector element 56 may also comprise a mirror.

Advantageously, the light guides 28', 28" are juxtaposed and adjacent to each other at at least one respective inner wall 64 thereof.

Moreover, the light guides 28', 28" are mechanically and optically separated by barrier elements 68 which prevent the passage of light between the light guides 28', 28" at the at least one inner wall 64.

The barrier elements 68 may be made/obtained in various ways. For example, the reflector element 56 may also be used as a barrier element 68 at the inner wall 60 between the juxtaposed and adjacent light guides 28', 28" (FIGS. 6 to 16).

Indeed, the reflector element 56 in fact reflects the light, thus preventing to be crossed by the light beam and therefore preventing a direct exchange of light between the adjacent light guides 28', 28".

The barrier element 68 may also comprise a film opaque to light.

A separator septum 72 opaque to light, which acts as barrier element 68 (FIGS. 1 to 3) may also be made.

The barrier element 68 may for example, be co-moulded with the reflector element 56, as in the case of the realization of the separator septum 72 (FIG. 3a).

The barrier element 68 and/or the reflector element 56 may be co-moulded together with the container body 8 which overall accommodates the LED light sources 16, the light guides 28', 28", the reflector elements 56 and the barrier elements 68.

The container body 8 in turn is preferably provided with an inner lateral surface 76 equipped with light reflector elements 56.

For example, the inner lateral surface 76 is reflective using a white film co-moulded along the inner lateral surface 76.

The LED light sources 16', 16" are arranged along a perimeter formed by the unification of the light guides 28', 28" and are powered/accommodated by an electronic board or several electronic boards 80 which follow the perimeter. The electronic boards 80 may be of the rigid or flexible type to better adapt to the perimeter.

The light guides 28 may have various shapes and conformations inside the container body 8.

According to a possible embodiment (FIGS. 1 to 5), the light guides 28', 28" have a substantially equal thickness, along a vertical direction Z perpendicular to the rear 52 and front 44 walls, and are juxtaposed at an inner wall 64 substantially perpendicular to the front 44 and rear 52 walls.

In other words, the light guides 28', 28" are juxtaposed with each other along a transverse direction T tangent to the respective light input walls 32.

In such a configuration, the light guides substantially are coplanar and overall, the lighting and/or signalling device 4 has a significantly reduced thickness.

The shapes and the dimensions of the light guides 28', 28" may be varied; the number of light guides may be greater than two and the light guides 28', 28" may be arranged to form lighting portions 36, 40 having any shape and extension, as for example shown in FIG. 5.

Thereby, different lighting portions may be turned on, also of an increased number (well over two units), in order to create possible optical effects or also in order to create text, logos, messages with the lighting portions which may have further functions with respect to the traditional one of lighting.

Figure 21:
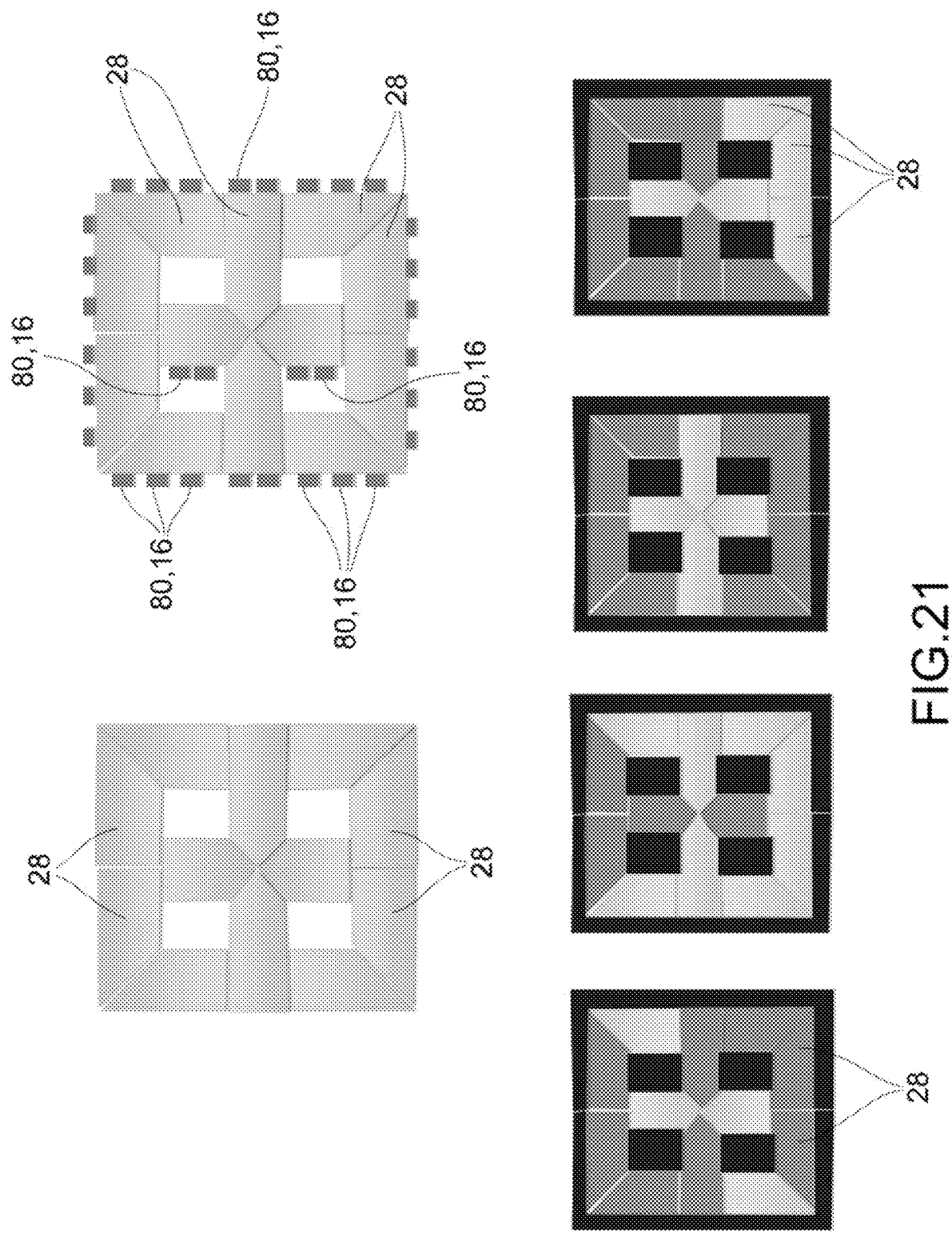
Figure 22:
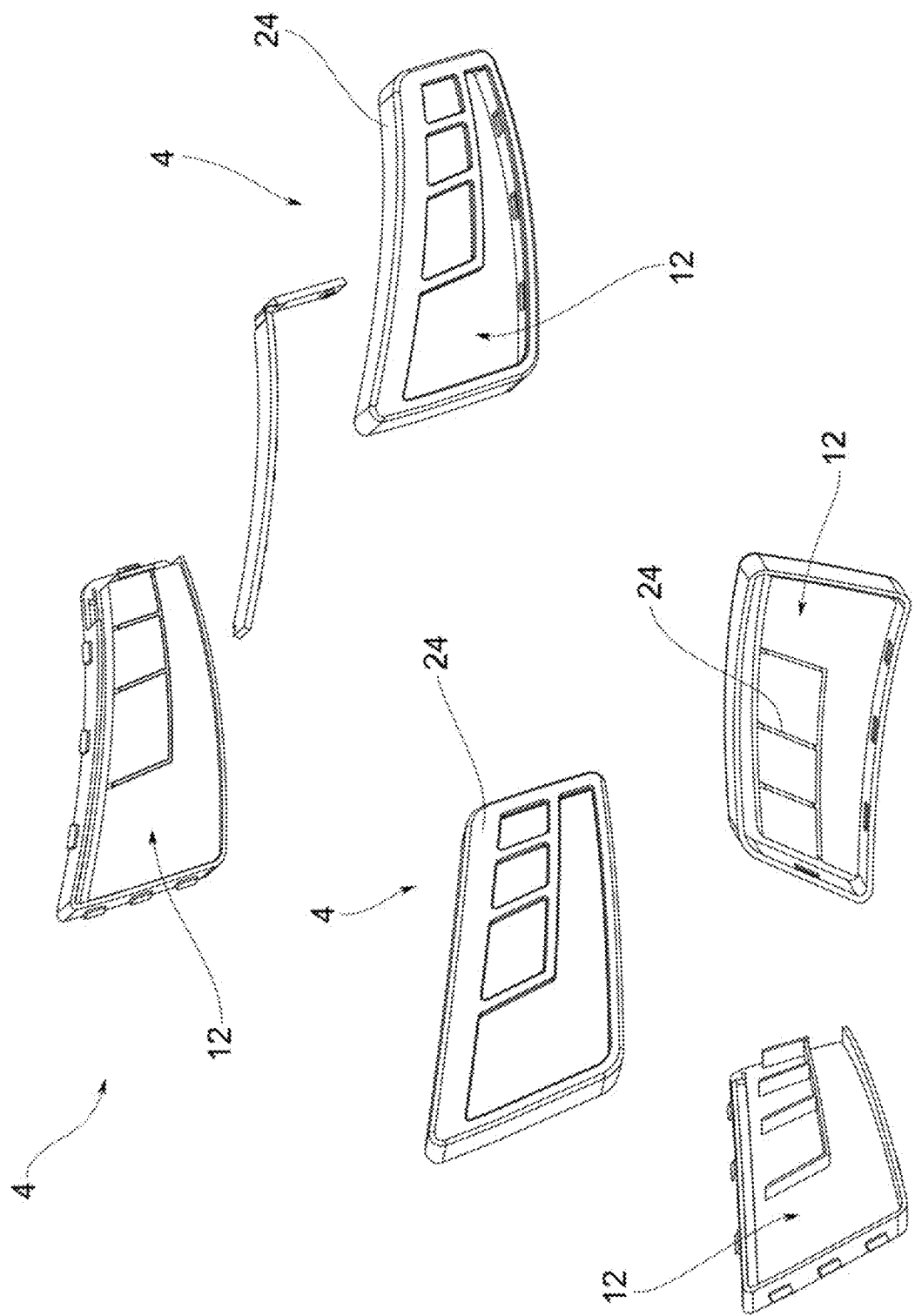
FIG. 22 shows perspective views from different angles, of a lighting and/or signalling device according to further embodiments of the present invention.

Thereby, the lighting device 4 becomes a signalling device. To this end, the light guides 28 may be shaped and arranged so as to have lighting portions arranged according to different geometrical schemes: thereby, alphanumeric codes may be composed which comprise both numbers and letters of the alphabet (as for example, shown in FIG. 21).

According to a possible embodiment (FIGS. 6 to 20), the light guides 28', 28" are juxtaposed and at least partially overlapped along the vertical direction Z-Z, perpendicular to the front 44 and rear 52 walls, at an inner wall 64 substantially parallel to the front 44 and rear 52 walls.

The lighting portions 36, 40 of the light guides 28', 28" are substantially adjacent without interruption, and the inner wall 64 comprises the reflector element 56 placed on the rear wall 52 of the first light guide 28' for the entire extension of the first lighting portion 36.

According to one embodiment (FIGS. 6 to 9), the second light guide 28" comprises a light input wall 32", placed below the first lighting portion 36 of the first light guide 28', and a second lighting portion 40 adjacent to the first lighting portion 36 at a prominence 84 of the inner wall 64.

The prominence 84 may have varied geometries; for example, prominence 84 has a ramp shape dimensioned so as to prevent a rearward reflection, i.e. towards the LED light source 16, of the light beam propagating in the light guide 28.

The diffuser elements 48 of the two light guides 28', 28" are arranged according to the same non-homogeneous scheme having a density that increases as the distance from the respective light source 16', 16" increases along the light guide 28', 28", in which the scheme of the second light guide 28" applies starting from the lighting portion of the second light guide 28" not overlapping the first light guide 28'.

According to one embodiment (FIGS. 6 to 7), the LED light sources 16', 16" are arranged alternately on light input walls 32', 32" of the light guides 28', 28", overlapped with each other, along a transverse direction T which is tangent to the light input walls 32', 32".

The barrier element 68, which prevents the light crossing the first stretch of the second light guide 28" from crossing the first light guide 28 and leading into the corresponding first lighting portion 36, is placed between the rear wall of the first light guide 28, which is equipped with the diffuser elements 48 and the reflector element 56, and the front wall 44 of the second light guide 28". The barrier element 68 extends also at the prominence 84.

Preferably, the barrier element 68 is made in the form of film having both the function of barrier for the light coming from the second light guide 28" and the function of reflecting the light coming from the rear wall 52 of the first light guide 28'.

Obviously, also the second light guide 28" is equipped, on the side of the rear wall 52 thereof, with diffuser elements 48 and the reflector element 56 placed behind the diffuser elements 48 so as to reflect and extract the light through the lighting portion 40 at the front wall 44.

According to a further possible embodiment (FIGS. 10 to 14*a*), the light input walls 32', 32" of the two light guides 28', 28" are juxtaposed and coplanar with each other. The LED light sources 16', 16" of each light guide 28', 28" extend along a transverse direction T for an amplitude less than a maximum transverse amplitude of each light guide 28', 28", the transverse direction T being tangent to the light input walls 32.

The first and second light guide 28', 28" have respective inverted prominences 84', 84" at the inner wall 64, on the side of the light input walls 32.

For example, the prominences 84', 84" have a beveled conformation or inclined surface conformation with opposite inclinations to each other.

The prominences 84 are shaped so as to facilitate the reflection of light beams inside the light guide 28', 28".

Figure 14A:
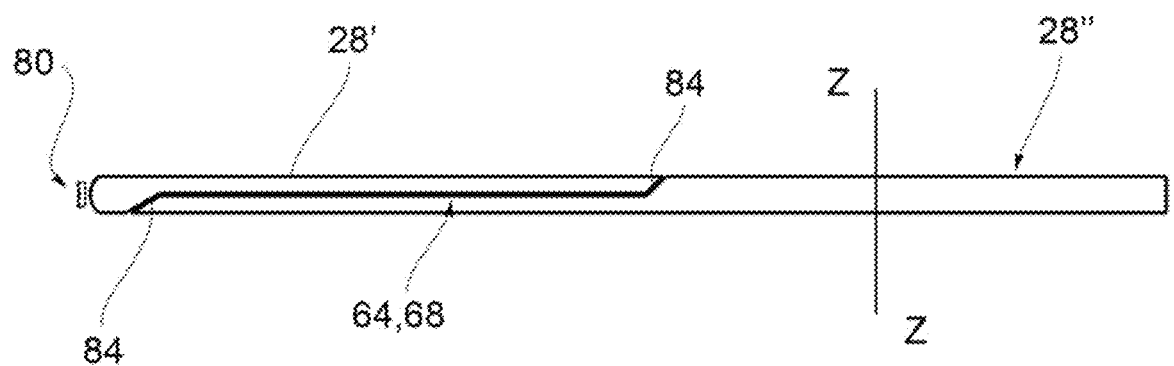
FIG. 14a shows a sectional view of the light guides in FIG. 12, along the cross-section plane XIV-XIV in FIG. 12.
Figure 14B:
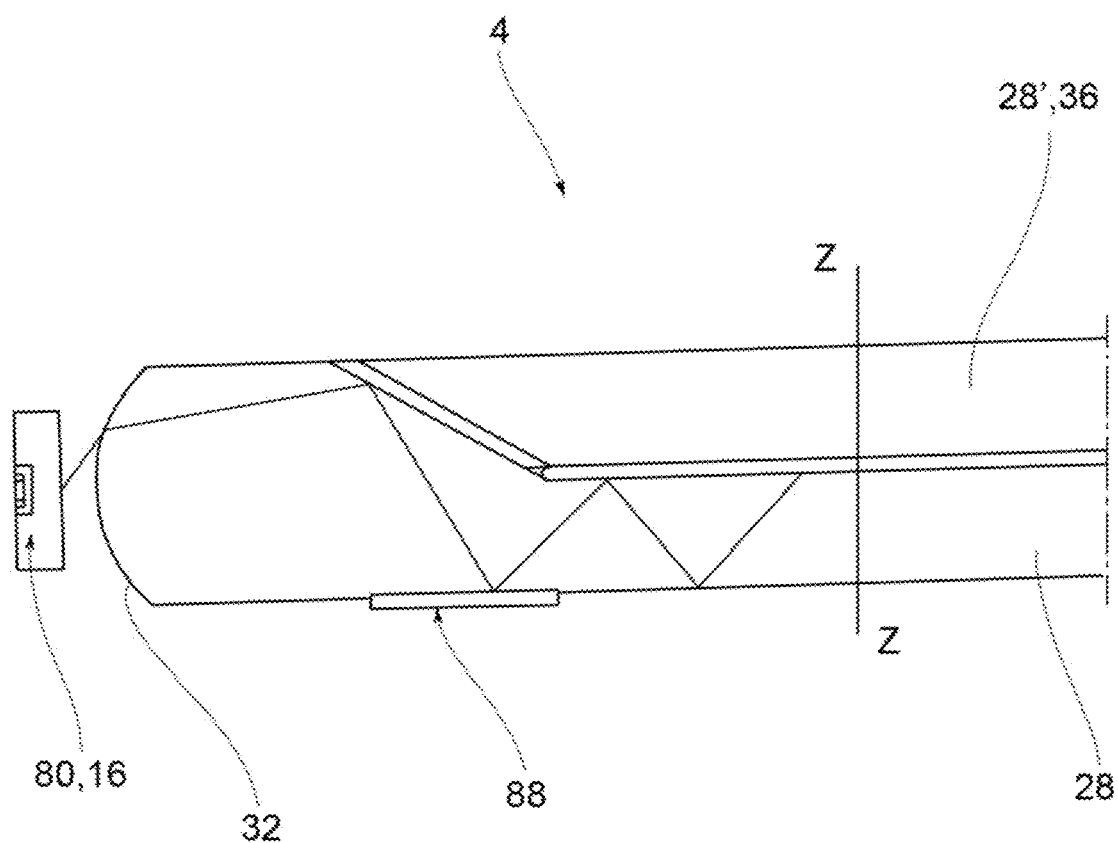
Figure 15:
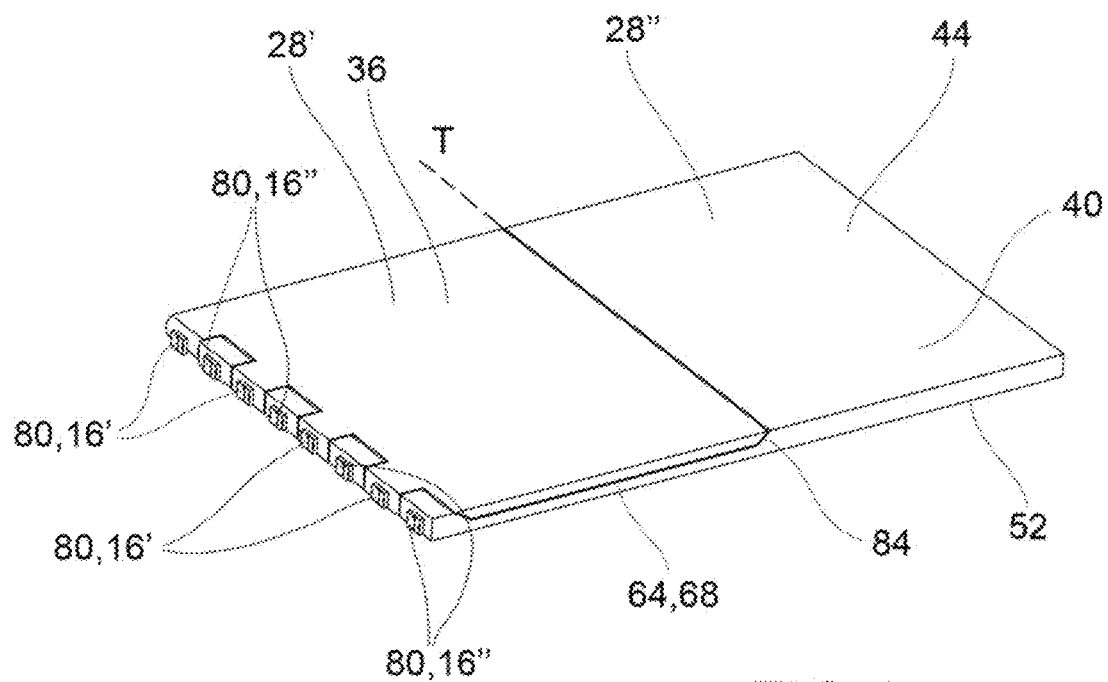
FIG. 15 shows a perspective assembled view of two light guides according to a further embodiment of the present invention.
Figure 16:
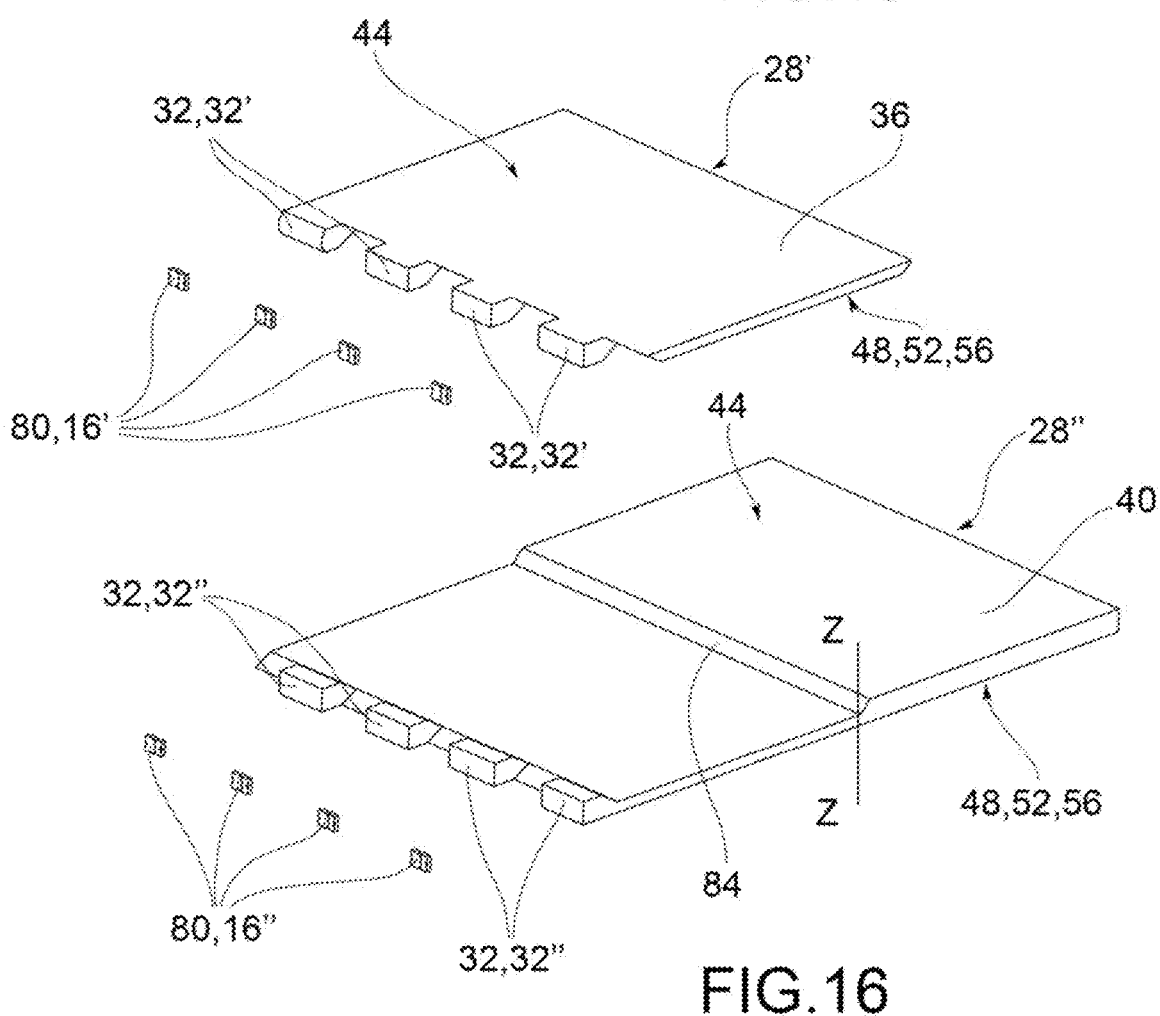
FIG. 16 shows a perspective view, in separate parts, of the light guides in FIG. 15.

To this end, the light guides 28', 28" may comprise guide reflectors 88 to facilitate the total internal reflection inside each light guide 28', 28" (FIG. 14*b*).

The barrier element 68, which prevents the light crossing the first stretch of the second light guide 28" from crossing the first light guide 28 and leading into the corresponding first lighting portion 36, is placed between the rear wall 52 of the first light guide 28', equipped with the diffuser elements 48 and the reflector element 56, and the front wall 44 of the second light guide 28". The barrier element 68 extends also at the inverted prominences 84', 84".

Preferably, the barrier element 68 is made in the form of film having both the function of barrier for the light coming from the second light guide 28" and the function of reflecting the light coming from the rear wall 52 of the first light guide 28'.

Obviously, also the second light guide 28" is equipped, on the side of the rear wall 52 thereof, with diffuser elements 48 and the reflector element 56 placed behind the diffuser elements 48 so as to reflect and extract the light through the lighting portion 40 at the front wall 44.

According to a further possible embodiment (FIGS. 15 to 18), the light sources 16', 16" are arranged coplanar with each other; the light input walls 32 of the two light guides 28', 28" are juxtaposed, alternating and at least partially penetrate each other.

There are provided, at each light input wall 32', 32", divergent optical elements 92 in order to mix with each other, as much as possible in the vicinity of the light sources 16', 16", the light cones emitted between the adjacent light sources 16', 16" belonging to the same light guide 28', 28".

Indeed, light cones of light sources 16', 16" powering the same light guide would intersect closer to the LED light sources 16', 16" with respect to the case in which such divergent optical elements 92 were not provided.

According to possible embodiments, the divergent optical elements 88 comprise holes made by laser cutting or injection moulding.

All the above-described lighting and/or signalling devices 4 according to one variant may comprise an opaline or embossed element 96 on the side of the front wall 44, at the lighting portions 36, 40.

The opaline or embossed element 96 may be applied onto the lighting portions 36, 40 in the form of film.

The opaline or embossed element 96 may also be applied directly on the lenticular body 20.

The technical effect of such an opaline or embossed element 96 is the one of further homogenizing the light beams emitted by the lighting portions of the lighting and/or signalling device in order to obtain a lighting uniformity completely equivalent to the one which may be obtained with an OLED technology.

The above-described relates to at least two juxtaposed light guides 28', 28". Obviously, the number of light guides 28 and of respective lighting portions 36, 40 is unlimited. Modules may therefore be made comprising for example, two light guides 28', 28" with at least two respective lighting portions 36, 40 and arranging them juxtaposed so as to form complex lighting structures which may form particular light signals, symbols, logos, text and messages of any kind, as is apparent for example, from FIGS. 5, 19, 20, 21.

Obviously, a suitable sequence for turning on the various lighting portions, due to separate controls of the respective LED light sources, will allow specific graphic effects, text and also various types of animations, to be obtained according to the needs of the user.

As may be noted from that described, the present invention allows the drawbacks presented in the known art to be overcome.

In particular, the automotive lighting and/or signalling device according to the present invention allows any predetermined light pattern provided with portions with any brightness level to be obtained, capable of absolving all the photometric specifications of the lamp but also capable of emitting light, graphic signals of any type so as to become an instrument for communicating information in addition to a light signalling and lighting instrument.

Moreover, the lighting and/or signalling device according to the present invention allows any animation to be obtained by the controlled activation according to a predetermined sequence of the lighting portions of the light guides.

Moreover, the various lighting portions have a level of homogeneity which is completely comparable with the ones which may be obtained with OLED technologies, while having decidedly decreased complexity and cost with respect to the latter technology.

Moreover, the lighting and/or signalling devices of the present invention have a highly reduced volume in depth, whereby they lend themselves to being applied both inside and outside the vehicle; moreover, the reduced thickness thereof facilitates the positioning in various positions since they do not require modifying the structure in which they are placed and they do not require particularly deep housings.

The lighting and/or signalling devices of the present invention may be both planar and curved and therefore they are suitable for being positioned in any point since they may easily be integrated in the curved lines of a body and/or dashboard without any difficulty.

Indeed, there are no geometry or pattern or shape limitations of the lighting portions which may be obtained.

The lighting patterns are further characterized in that they have significant uniformity and homogeneity of the light beam diffused outside the device.

Thus, a light pattern, i.e. any lighting surface, i.e. having any geometrical shape, may be obtained due to the present invention, while maintaining an increased energy efficiency and lighting homogeneity of the pattern itself.

The solution is simple to make, with limited costs, weights and volumes.

A person skilled in the art, in order to meet contingent and specific needs, can make several changes and variants to the above-described lighting and/or signalling devices, moreover all contained within the scope of the invention, which is defined by the following claims.

The invention claimed is:

1. A lighting and/or signalling device, in particular for the automotive sector, comprising:
   at least two LED light sources, powered and activated separately, each facing a respective light input wall of a corresponding light guide,
   wherein said light guides are suitable to emit the light of said LED light sources through at least two separate lighting portions at a front wall, the light guides being equipped with diffuser elements arranged on a rear wall opposite the front wall,
   at least one reflector element associated with each light guide directly facing the respective diffuser elements so as to reflect the light towards the front wall,
   wherein said light guides are juxtaposed and adjacent to each other at at least one respective inner wall, and
   wherein said light guides are mechanically and optically separated by barrier elements which prevent the passage of light between the light guides at said at least one inner wall.

2. The lighting and/or signalling device as set forth in claim 1, wherein the diffuser elements are micro-lenses which diffuse the light towards the front wall.

3. The lighting and/or signalling device as set forth in claim 1, wherein the diffuser elements are arranged according to a non-homogeneous scheme having a density that increases as the distance from the corresponding LED light source increases along the extension of the light guide.

4. The lighting and/or signalling device as set forth in claim 1, wherein the reflector element is a white film reflecting the light coming from the rear wall of the light guides.

5. The lighting and/or signalling device as set forth in claim 1, wherein the reflector element is a mirror.

6. The lighting and/or signalling device as set forth in claim 1, wherein said reflector element also acts as a barrier element at the inner wall between the juxtaposed and adjacent light guides.

7. The lighting and/or signalling device as set forth in claim 1, wherein the barrier element comprises a film opaque to light.

8. The lighting and/or signalling device as set forth in claim 1, wherein the barrier element is a separator septum opaque to light.

9. The lighting and/or signalling device as set forth in claim 1, wherein the barrier element is a co-moulded with the reflector element.

10. The lighting and/or signalling device as set forth in claim 1, wherein the light guides and the respective LED light sources have a total internal reflection condition of the light beam passing through the light guides.

11. The lighting and/or signalling device as set forth in claim 1, wherein a light input wall of the light guides, directly facing the corresponding LED light sources, transmits the light inside the light guide in the total internal reflection condition.

12. The lighting and/or signalling device as set forth in claim 1, wherein a light input wall of the light guides comprises sinusoidal, cylindrical, cylindrical or prismed section lenses.

13. The lighting and/or signalling device as set forth in claim 12, wherein said lenses have a pitch between 50 µm and 2 mm.

14. The lighting and/or signalling device as set forth in claim 1, wherein the light guides, the reflectors and the barrier elements are contained inside a container body equipped with an inner lateral surface equipped with reflector elements of the light.

15. The lighting and/or signalling device as set forth in claim 14, wherein the LED light sources are arranged along a perimeter formed by the unification of the light guides and are powered by an electronic board or several electronic boards which follow said perimeter.

16. The lighting and/or signalling device as set forth in claim 1, wherein on the side of the front wall, at the lighting portions an opaline or embossed element is arranged.

17. The lighting and/or signalling device as set forth in claim 1, wherein on the side of the front wall a lenticular body is applied shaped to be crossed by the light beam leaving the lighting portions of the light guides.

18. The lighting and/or signalling device as set forth in claim 1, wherein the light guides have a substantially equal thickness, along a vertical direction perpendicular to the rear and front walls, and are juxtaposed at an inner wall substantially perpendicular to the front and rear walls.

19. The lighting and/or signalling device as set forth in claim 1, wherein the light guides are juxtaposed and at least partially overlapped along a vertical direction, perpendicular to the front and rear walls, at an inner wall substantially parallel to the front and rear walls.

20. The lighting and/or signalling device as set forth in claim 19, wherein the lighting portions are substantially adjacent without interruption, and the inner wall comprises the reflector element placed on the rear wall of the first light guide for the entire extension of the first lighting portion.

21. The lighting and/or signalling device as set forth in claim 1, wherein the second light guide comprises a light input portion, placed below the first lighting portion, and a second lighting portion adjacent to the first lighting portion at a prominence of the inner wall.

22. The lighting and/or signalling device as set forth in claim 21, wherein said prominence is a ramp shape dimensioned so as to prevent a rearward reflection, towards the LED light source, of the light beam propagating in the light guide.

23. The lighting and/or signalling device as set forth in claim 19, wherein the diffuser elements of the two light guides are arranged according to the same non-homogeneous pattern having a density that increases as the distance from the LED light source increases, along the light guide, wherein the pattern of the second light guide applies starting from the lighting portion of the second light guide not overlapping the first light guide.

24. The lighting and/or signalling device as set forth in claim 19, wherein the led sources are arranged alternately on light input walls of the light guides, overlapping with each other, along a transverse direction, tangent to the light input walls.

25. The lighting and/or signalling device as set forth in claim 19, wherein the LED light sources are arranged coplanar with each other, the light input walls of the two light guides are juxtaposed and coplanar with each other, wherein the light sources of each light guide extend along a transverse direction for an amplitude less than a maximum transverse amplitude of each light guide, the transverse direction being tangent to the light input walls.

26. The lighting and/or signalling device as set forth in claim 25, wherein the first and second light guide, at said inner wall, on the side of the light input walls, have respective inverted prominences.

27. The lighting and/or signalling device as set forth in claim 26, wherein said prominences are shaped so as to facilitate the reflection of light beams inside said light guide.

28. The lighting and/or signalling device as set forth in claim 1, wherein the light guides comprise guide reflectors to facilitate the total internal reflection inside each light guide.

29. The lighting and/or signalling device as set forth in claim 1, wherein the LED light sources are arranged coplanar with each other, the light input walls of the two light guides are juxtaposed, alternated and at least partially penetrate each other.

30. The lighting and/or signalling device as set forth in claim 29, wherein at the respective light input walls, divergent optical elements are provided in order to mix with each other, as much as possible in the vicinity of the LED light sources, the light cones emitted between the adjacent LED light sources belonging to the same light guide.

31. The lighting and/or signalling device as set forth in claim 30, wherein said divergent optical elements comprise holes, made by laser cutting or injection moulding.

* * * * *